US005669224A

United States Patent [19]

Lenarduzzi

[11] Patent Number: 5,669,224
[45] Date of Patent: Sep. 23, 1997

[54] DIRECT EXPANSION GROUND SOURCE HEAT PUMP

[75] Inventor: Frank J. Lenarduzzi, Oakville, Canada

[73] Assignee: Ontario Hydro, Toronto, Canada

[21] Appl. No.: 671,055

[22] Filed: Jun. 27, 1996

[51] Int. Cl.[6] .................................................. F25B 13/00
[52] U.S. Cl. ........................... 62/160; 62/196.4; 62/260; 62/238.7
[58] Field of Search ...................... 62/160, 260, 196.4, 62/174, 238.6, 238.7, 324.6, 324.4, 503; 165/45

[56] References Cited

U.S. PATENT DOCUMENTS

| | | | |
|---|---|---|---|
| 3,153,913 | 10/1964 | Brody | 62/125 |
| 3,212,284 | 10/1965 | Henderson | 62/117 |
| 3,237,422 | 3/1966 | Pugh | 62/149 |
| 3,986,344 | 10/1976 | Newman | 62/238 |
| 4,042,012 | 8/1977 | Perry et al. | 62/324 |
| 4,045,977 | 9/1977 | Oliver, Jr. | 62/324 |
| 4,091,636 | 5/1978 | Margen | 62/238 |
| 4,325,357 | 4/1982 | Wormser | 126/427 |
| 4,360,056 | 11/1982 | O'Connell | 165/45 |
| 4,361,135 | 11/1982 | Metz | 126/437 |
| 4,365,482 | 12/1982 | Länggård | 62/149 |
| 4,423,603 | 1/1984 | Oguni et al. | 62/324 |
| 4,484,452 | 11/1984 | Houser, Jr. | 62/174 |
| 4,688,392 | 8/1987 | Fujimoto | 62/174 |
| 4,741,388 | 5/1988 | Kuroiwa | 165/45 |
| 4,765,149 | 8/1988 | Shiga et al. | 62/174 |
| 5,136,855 | 8/1992 | Lenarduzzi | 62/260 X |
| 5,388,419 | 2/1995 | Kaye | 62/196.4 X |

FOREIGN PATENT DOCUMENTS

| | | |
|---|---|---|
| 37 09 628 | 10/1987 | Germany . |
| 60-086336 | 5/1985 | Japan . |
| 0385560 | 9/1990 | Japan . |

OTHER PUBLICATIONS

Patent Abstracts of Japan, vol. 9, No. 229 (M–413 14 Sep. 1985).

Primary Examiner—Harry B. Tanner
Attorney, Agent, or Firm—Ridout & Maybee

[57] ABSTRACT

A direct expansion ground source heat pump operable in heating mode and cooling mode. The heat pump comprises an outdoor coil, an indoor coil and a compressor. The outdoor coil and the indoor coil are coupled to the compressor through a reversing valve and the compressor provides a refrigerant flow through the coils. The indoor coil and outdoor coil are coupled together through a controllable valve. The outdoor coil comprises two coil circuits. In heating mode both ground coil circuits are active, while in cooling mode, the heat pump utilizes one of the coil circuits and alternates between coil circuits each compressor cycle.

8 Claims, 6 Drawing Sheets

DIRECT EXPANSION GROUND SOURCE HEAT PUMP

FIELD OF THE INVENTION

The present invention relates to heat pumps, and more particularly to a direct expansion ground source heat pump.

BACKGROUND OF THE INVENTION

Ground source heat pumps are known for use in controlling temperatures in residential homes, commercial buildings and other structures. A typical ground source heat pump comprises an outdoor coil for transferring heat from or to the ground, an indoor coil for transferring heat to or from the environment sought to be controlled, and a compressor for compressing the refrigerant, and discharging the refrigerant to either the outdoor coil or the indoor coil, depending upon the mode in which the heat pump is operating.

A number of problems have been presented by known heat pump designs. In U.S. Pat. No. 5,136,855 issued Aug. 11, 1992 to Lenarduzzi, the inventor of the present invention, the problems associated with a heat pump utilizing a piston or reciprocating compressor were addressed.

Problems remain in the art with heat pump designs which provide both heating and cooling functions with the same basic unit. A problem associated with such heat pumps is the need to provide more refrigerant when in the cooling mode. Conventional heat pumps typically include a manual switchover to increase the volume of refrigerant in the pump for operation in cooling mode. The manual switch-over to cooling mode is inconvenient and typically requires the manual injection of additional refrigerant into the heat pump system. An insufficient refrigerant charge reduces the efficiency of the heat pump in cooling mode.

The present invention addresses these disadvantages.

BRIEF SUMMARY OF THE INVENTION

The present invention provides an improved heat pump having an indoor coil, a compressor circuit, and an outdoor coil.

The outdoor coil comprises two ground coil circuits forming two "zones". Each ground coil circuit comprises two, three, four or more coils which are buried in the ground.

In cooling mode, the heat pump utilizes only one of the two ground coil circuits and alternates between the two ground coil circuits at each compressor cycle. In heating mode, the heat pump utilizes both ground coil circuits. This feature results in more efficient heat transfer because the two ground coil circuits provide a greater area for heat transfer to occur, i.e. between the refrigerant and the ground. However, to maintain such an arrangement in the cooling mode would require the addition of a significant amount of refrigerant which is unacceptable for practical implementation. The zoning of the ground coil circuits and alternating between zones according to the invention results in a heat pump which approaches the efficiency of a system utilizing the entire ground coil circuit, but with a greatly reduced refrigerant volume.

The present invention provides a heat pump operable in heating mode to heat a space and cooling mode to cool to the space. The heat pump includes a compressor for providing a refrigerant flow in the heat pump. The heat pump comprises an indoor coil coupled to the compressor through a reversing valve, and an outdoor coil coupled to the compressor through the reversing valve. The indoor coil and outdoor coil are coupled to each other through a controllable valve. The outdoor coil comprises first and second coil circuits, and an actuator is provided for alternately actuating one of the coil circuits when operating the heat pump in cooling mode, so that one of the coil circuits is active for receiving refrigerant from the compressor.

In one aspect, the present invention provides a heat pump operable in heating mode to heat a building space and cooling mode to cool the building space, said heat pump comprising: (a) a compressor coupled to a reversing valve for providing a refrigerant flow in the heat pump; (b) an indoor coil coupled to said reversing valve for receiving refrigerant; (c) an outdoor coil coupled to said compressor, and said outdoor coil having first and second coil circuits coupled to said reversing valve for receiving refrigerant; (d) coupling means for coupling said indoor coil to said outdoor coil for providing a flow path for said refrigerant between said indoor coil and said outdoor coil, and including means for reversing said flow path; and (e) actuator means for alternately actuating one of said coil circuits in said outdoor coil when operating said heat pump in cooling mode, so that one of said coil circuits is active for receiving refrigerant from said compressor.

BRIEF DESCRIPTION OF THE DRAWINGS

Reference will now be made, by way of example, to the accompanying drawings which show a preferred embodiment of the present invention, and in which.

DETAILED DESCRIPTION OF THE PREFERRED EMBODIMENTS

Figure 1:
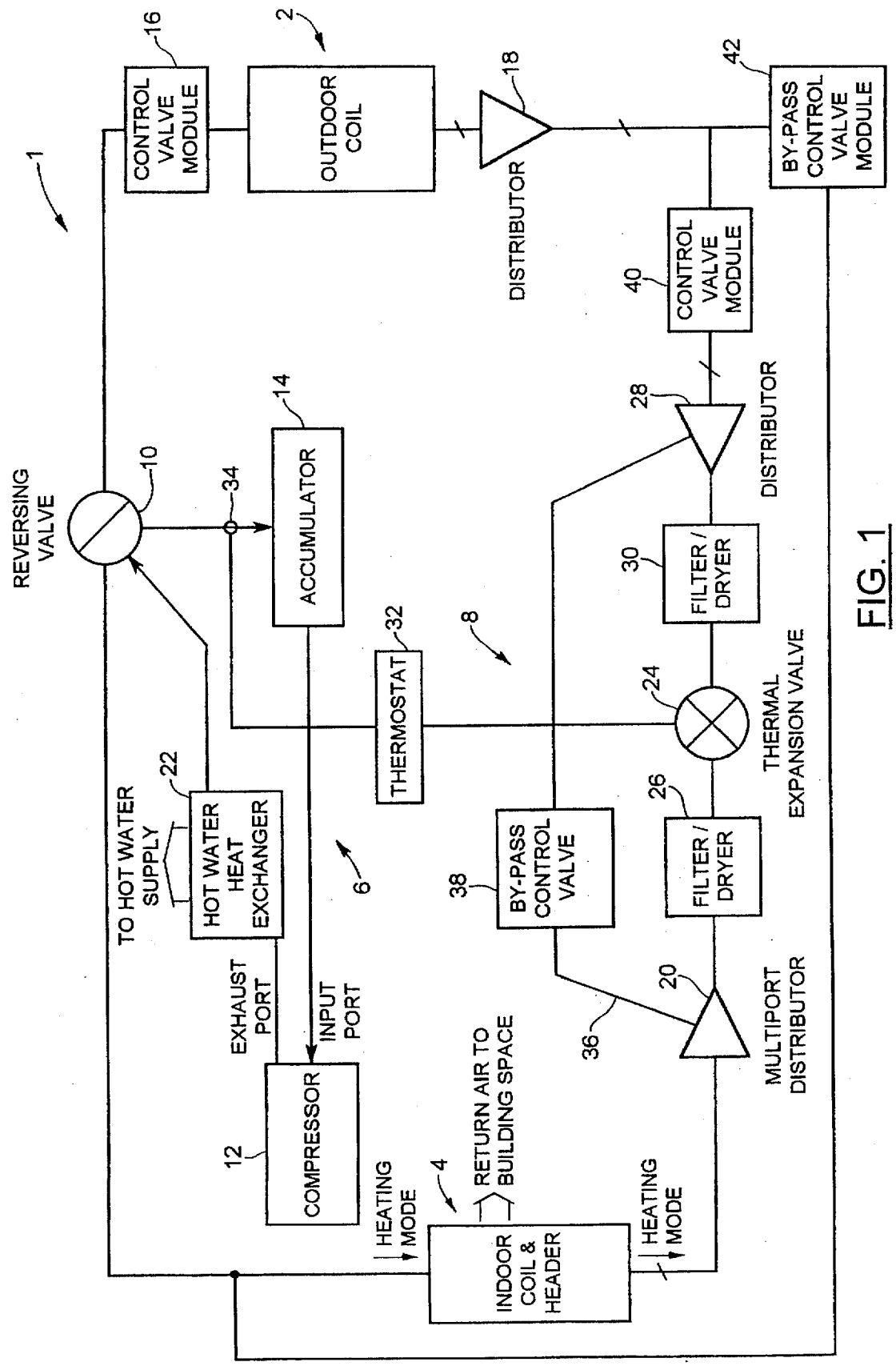
FIG. 1 is a block diagram of a heat pump according to the present invention.

Reference is first made to FIG. 1 which shows in block diagram form a heat pump 1 according to the present invention. The heat pump 1 utilizes a refrigerant and provides heating or cooling to a building space as described below. The heat pump 1 of the present invention comprises an outdoor coil, generally designated 2, an indoor coil, generally designated 4, and a compressor loop, generally designated 6, and a thermal valve circuit, generally designated 8.

The compressor loop 6 comprises a reversing valve 10, a compressor 12 and an accumulator 14. Preferably, the compressor 12 is a scroll compressor as described in U.S. Pat. No. 5,136,855, or other suitable compressor. In known manner, the compressor 12 compresses the refrigerant in the heat pump 1 in order to heat the refrigerant. The accumulator 14 is coupled to the inlet of the compressor 12 and an outlet of the reversing valve 10. The reversing valve 10 controls the direction of refrigerant flow in the heating and cooling modes. The accumulator 14 is a device of known design and operates to separate the liquid and gaseous components of the refrigerant prior to compression. This helps ensure that only gaseous refrigerant enters the inlet of the compressor.

The outdoor coil 2 or ground coil is buried directly in the ground and provides the lines for exchanging heat between the refrigerant and the ground. In heating mode, the outdoor coil 2 functions as an evaporator and allows the refrigerant to absorb heat from the ground for heating the building space. Conversely in cooling mode, the outdoor coil 2 functions as a condenser and the refrigerant releases waste heat to the ground in order to cool the building space.

The outdoor coil 2 has one end coupled to the compressor 12 through the reversing valve 10 and a control valve module 16. The other end of the outdoor coil 2 is coupled to the thermal expansion valve circuit 8 through a distributor 18. The reversing valve 10 controls the direction of flow of the refrigerant through the outdoor coil 2 depending on the mode of operation, i.e. cooling or heating, as described in more detail below.

Figure 2:
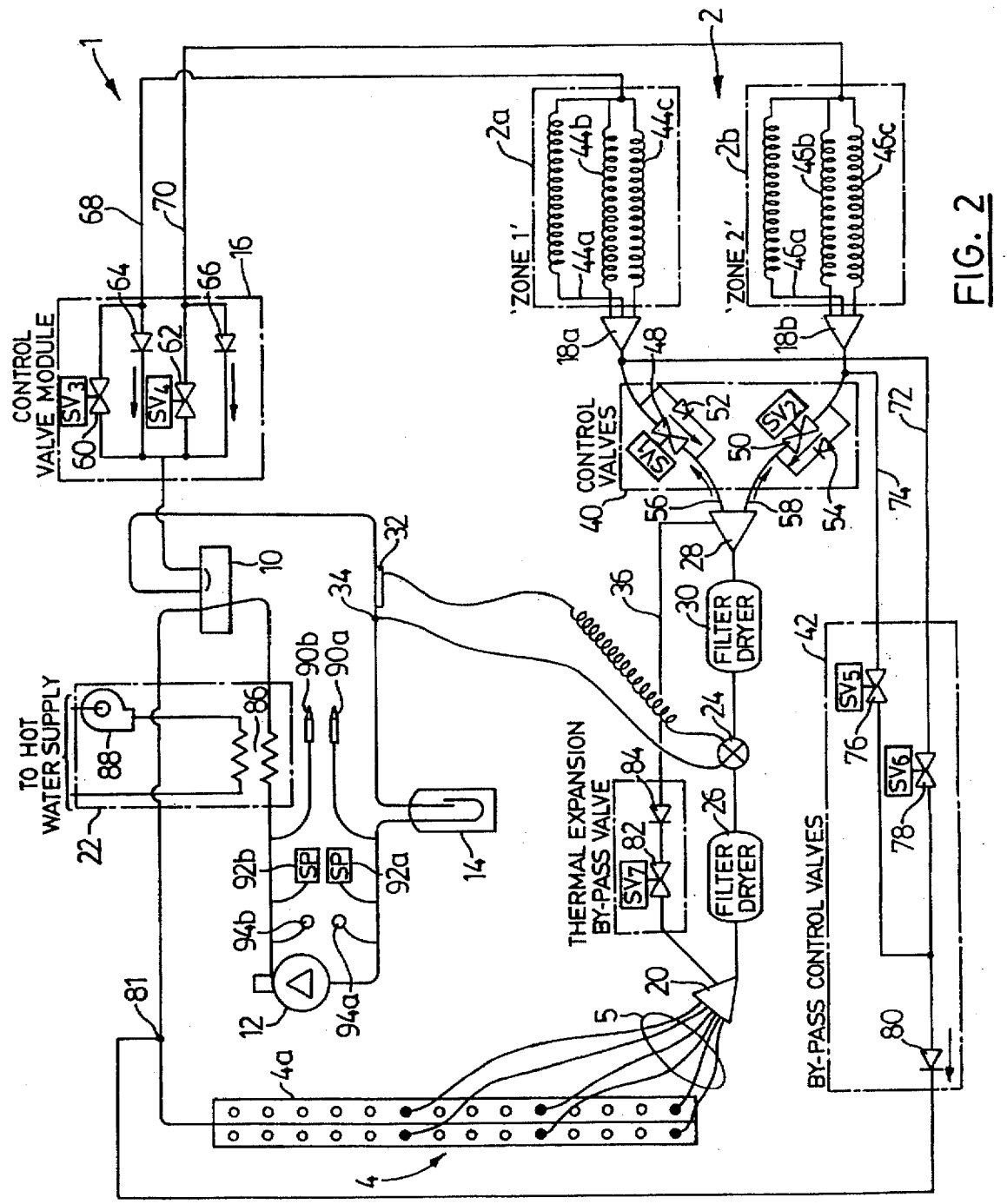
FIG. 2 is a schematic diagram of the heat pump of FIG. 1.

The indoor coil 4 provides the heat exchange element for heating or cooling the building space. In cooling mode, the indoor coil 4 functions as an evaporator and the refrigerant absorbs heat from the building space to cool it. Conversely in heating mode, the indoor coil 4 functions as a condenser and the refrigerant releases heat to the building space. The indoor coil 4 comprises a conventional device such as an "A" coil type heat exchanger as will be known to one skilled in the art, and includes a header or manifold which is illustrated in FIG. 2 and denoted by reference 4a.

As shown in FIG. 1, the indoor coil 4 is coupled to the thermal expansion valve circuit 8 through a multi-port distributor 20. The other port of the indoor coil 4 is coupled to the reversing valve 10, which controls the direction of the flow of the refrigerant through the indoor coil 4 according to the mode of operation, i.e. heating or cooling.

Referring to FIG. 1, the heat pump 1 according to the present invention may include a hot water heat exchanger 22. The heat exchanger 22 is coupled between the outlet of the compressor 12 and an inlet to the reversing valve 10. (If the heat exchanger 22 is not included, the outlet of the compressor 12 is coupled to an inlet of the reversing valve 10.) The heat exchanger 22 removes excess heat from the heated refrigerant exhausted from the compressor 12 and this heat is used to heat hot water in the building thereby supplementing the hot water supply.

As shown in FIG. 1, the thermal expansion valve circuit 8 comprises a thermal expansion valve 24 of known design. The thermal expansion valve 24 meters the amount of refrigerant flowing to the coils 2,4. By providing a pressure drop of the compressed refrigerant, the thermal expansion valve 24 has the effect of reducing the temperature of the refrigerant. The thermal expansion valve 24 has one port coupled to the multi-port distributor 20 through a first filter/dryer 26. The second port of the thermal expansion valve 24 is coupled to another distributor 28 through a second filter/dryer 30. The filter/dryers 26,30 are of known design. The temperature control port of the thermal expansion valve 24 is connected to a thermostat 32. The thermostat 32 is coupled to the inlet of the accumulator 14, described in greater detail below, through a temperature sensing bulb 34. It is advantageous to have the sensing bulb 34 coupled to the inlet of the accumulator 14 in order to allow the thermal expansion valve 24 to operate in both heating and cooling modes.

The thermal expansion valve circuit 8 includes a bypass line 36 for bypassing the thermal expansion valve 24 as shown in FIG. 1. The bypass line 36 is coupled to respective ports on the multi-port distributor 20 and the distributor 28. The bypass line 36 includes a thermal expansion bypass valve 38 for controlling the flow of refrigerant through the bypass line 36.

Referring again to FIG. 1, the distributor 28 in the thermal circuit 8 is coupled to the distributor 18 from the outdoor coil 2 through a control valve module designated by 40. The control valve module 40 controls the flow of refrigerant through the outdoor coil 4 as described in greater detail below. The heat pump 1 according to the present invention also includes another bypass control valve module 42 which is coupled to the distributor 18 of the outdoor coil 2 and the input (i.e. header) to the input coil 4. The bypass module 42 provides a drain path for refrigerant trapped in the unused coil of the outdoor coil 2 in cooling mode, as described in more detail below.

Figure 5:
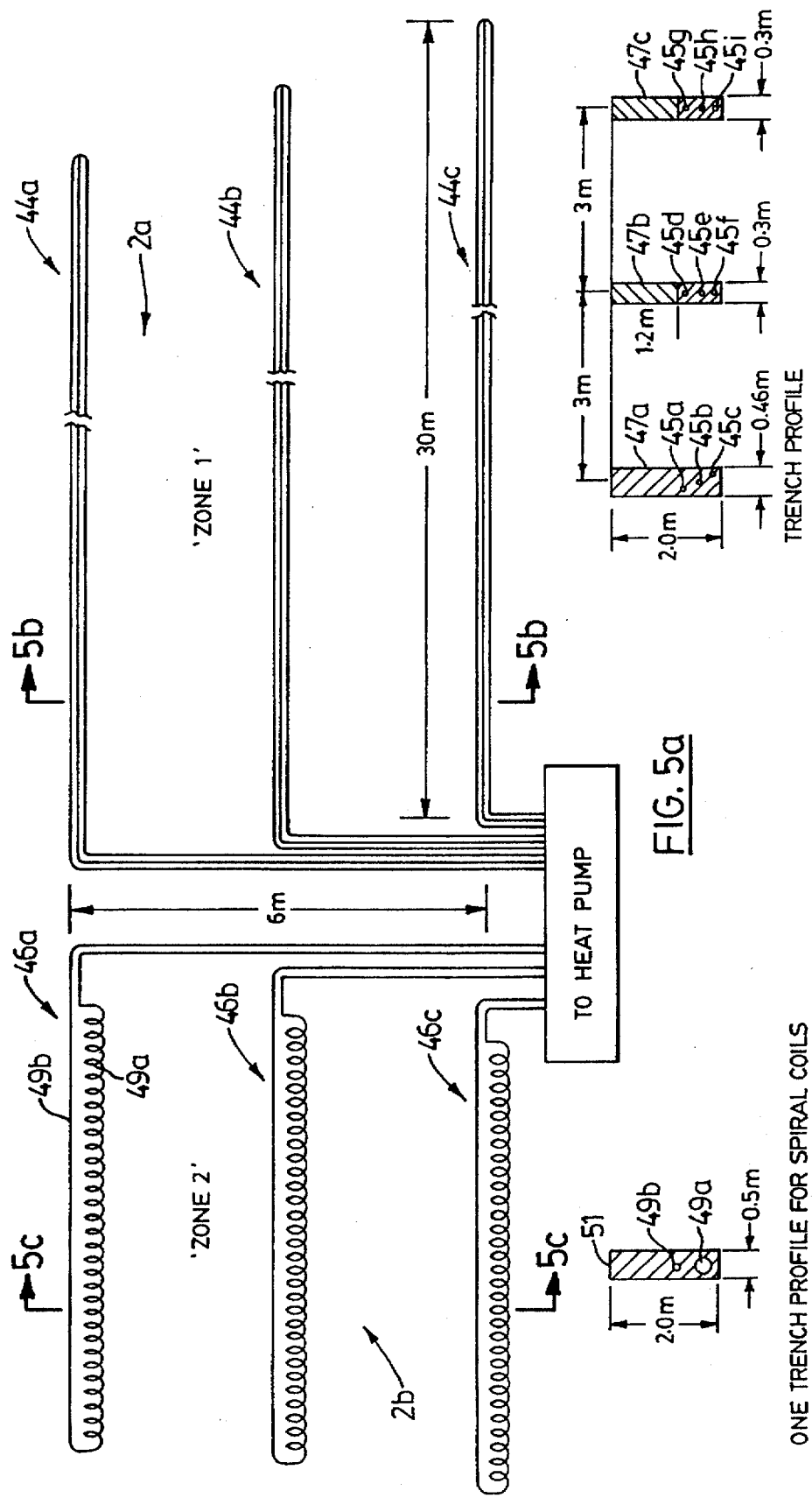
FIG. 5(a) shows a physical layout for a ground coil circuit for the heat pump of FIG. 2.
FIG. 5(b) is a sectional view of the layout of FIG. 5(a) taken on line A—A.
FIG. 5(c) is a sectional view of the layout of FIG. 5(a) take on line B—B.

Reference is next made to FIG. 2 which shows the heat pump 1 in more detail. It is a feature of the present invention that the outdoor coil 2 comprises two coil circuits 2a, 2b as shown in FIG. 2. The first coil circuit 2a forms a first zone and comprises three ground coils 44a, 44b, 44c. Alternatively, the coil circuit 2a, 2b may comprise two, four or more ground coils, and the length of available trenches for burying the coils 44 will be a factor. Each of the ground coils 44a, 44b, 44c in turn is made up of three pipes 45a, 45b, 45c through 45i as shown in FIG. 5(b). The second coil circuit 2b forms a second zone and comprises three coils 46a, 46b, 46c with each coil 46 formed as two pipes 49a, 49b (FIG. 5(c)). Preferably, the pipes 45 for the ground coils 44a, 44b, 44c comprise a reinforced plastic pipe configured in a spiral arrangement and the pipe 45 has an outside diameter of approximately 0.5 inches. In another embodiment, the pipes are made from copper.

In heating mode, two coils, e.g. 44a and 44b, act as the returns, and the third coil 44c acts as the supply. In cooling mode, one coil, e.g. 44a, acts as the return, and the other two coils 44b, 44c act as the supplies.

Reference is made to FIGS. 5(a) and 5(b) which show how the pipes 45 for the ground coils 44a, 44b, 44c are buried in three separate trenches 47a, 47b, 47c. The trenches 47 are approximately 2 meters deep by 30 meters long. Each trench 47 is laid with 90 m of pipe for a total 270 m of pipe 45 per ground coil zone, i.e. 2a, 2b. To improve thermal conductivity each trench is filled with a backfill comprising backfill sand or limestone screenings (i.e. crushed limestone) around the pipes 45. Excavated native soil is used to fill the backfill grade as depicted for trenches 47b, 47c. The other ground coil circuit 2b is constructed in a similar fashion, or alternatively, as shown in FIG. 5(c). Each coil 46a, 46b, 46c is formed from two pipes 49a, 49b as shown in FIG. 5(b) and FIG. 5(c). The pipe 49a comprises a spiral coil pipe and an uncoiled pipe 49b both pipes 49 being buried in a trench 51. The pipe 49 may be plastic or copper. The length of the spiral coil pipe 49a will vary depending on the spiral coil spacing and the length of the trench 51. For example, each trench 51 may be laid with 60 m of pipe for a total of 180 m of pipe in the three trenches.

The heat pump using an outdoor coil 2 of this design is charged with approximately 7 to 9 kilograms of chlorodiflouromethane for the refrigerant or other suitable substitute refrigerants as will within the understanding of those skilled in the art.

It is a feature of the present invention that the ground coil 2 comprises two coil circuits 2a, 2b. It is also a feature of the present invention that the heat pump 1 alternates between the two ground coil circuits 2a, 2b in cooling mode. When the compressor 12 shuts off at the end of a cycle, a toggle relay 13 (shown in FIG. 6) switches the active ground coil circuit 2a or 2b. On start-up of the compressor 12 for the next cycle, the heat pump 1 operates with the other ground coil circuit. The dual coil circuits 2a, 2b provide a heat pump 1 with improved performance. Such operation provides a longer period for the ground to dissipate the heat energy of the refrigerant contained in the coil 2a or 2b. This produces a more efficient heat pump 1 especially when the ground temperature is warm. Another aspect of the dual zone ground coil circuit 2a, 2b according to the present invention is the ability of the heat pump 1 to borrow additional refrigerant that is dormant in the non-active ground circuit coil. This feature also improves the performance of the heat pump 1 because in cooling mode a heat pump will require more refrigerant than in heating mode. As will be described below, control of the primary refrigerant flow is achieved by the control valve modules 16 and 40.

Referring to FIG. 2, the outdoor coil 2 is coupled to the reversing valve 10 through the control valve block 16. The outdoor coil 2 also includes the distributor 18 for coupling to the thermal valve circuit 8 through another distributor 28. As shown in FIG. 2, the distributor 18 comprises first and second distributors 18a, 18b. The first distributor 18a is coupled to the ground coils 44a, 44b, 44c forming the coil circuit 2a, i.e. zone 1. The second distributor 18b is coupled to the ground coils 46a, 46b, 46c forming the second coil circuit 2b, i.e. zone 2. The other ports of each distributor 18a, 18b are coupled to the control valve module 40. The distributors 18a, 18b are of conventional design, and preferably meter equal amounts of refrigerant into each respective ground coil 44a, 44b, 44c and 46a, 46b, 46c.

The control valve modules 16 and 40 control the direction of refrigerant flow in the heating and cooling modes. The control valve module 40 comprises first and second solenoid valves 48 and 50, and check valves 52, 54. When the solenoid valves 48, 50 are closed, the check valves 52, 54 direct the flow of refrigerant as indicated by the arrows. The solenoid 48 and check valve 52 form one line or flow path 56 and the solenoid 50 and check valve 54 form another flow path or line 58, and both paths 56, 58 couple to the distributor 28.

Referring still to FIG. 2, the control valve module 16 which connects the outdoor coil circuits 2a, 2b to the reversing valve 10 comprises first and second solenoid valves 60, 62 and two check valves 64 and 66. The solenoid 60 and check valve 64 form one flow path 68 which connects the first outdoor coil circuit 2a to the reversing valve 10. The other solenoid 62 and check valve 66 form another flow path 70 which couples the second outdoor coil circuit 2b to the reversing valve 10.

As shown in FIG. 2, the coupling between the distributors 18a, 18b and the control valve module 40 also includes respective flow paths 72, 74 to the bypass control module 42. The bypass control module 42 controls flow of refrigerant from the outdoor coils circuits 2a, 2b as will be described in more detail below. The by-pass control module 42 comprises two solenoid valves 76, 78 each having an input connected to one of the flow paths 72, 74 as shown in FIG. 2. The outputs of the solenoid valves 76, 78 are connected to the input of a check valve 80, and the output of the check valve 80 is coupled to the header 4a of the indoor coil 4 at junction 81. The header 4a is a component of the heat exchanger 4 which comprises a series of pipes 5 which are coupled to the multi-port distributor 20.

Referring again to FIG. 2, the thermal expansion bypass valve 38 coupled between the multi-port distributor 20 and the distributor 28 comprises a solenoid valve 82 and a check valve 84 connected in series. The check valve 84 determines the flow of refrigerant in the direction indicated by the arrow, i.e. from the outdoor coil 2 to the indoor coil 4. The bypass valve 38 aids the operation of the heat pump 1 in the cooling cycle. The solenoid valve 82 will open if the suction pressure drops below 240 kPa (35 psig) and remains open until the suction pressure reaches 450 Kpa (65 psig). With the solenoid valve 82 open, the refrigerant flow through the thermal expansion valve 24 is by-passed thereby increasing the mass flow rate into the evaporator (i.e. indoor coil 4). This control sequence is sometimes needed when the ground coil 2 is cold. If the ground is very cold or frozen, for example in the spring, and the pump 1 is operating in cooling mode, the refrigerant will have difficulty returning to the indoor coil 4 from the ground even with one half of the ground coil circuit, i.e. 2a or 2b, isolated and draining to the suction intake of the compressor 12. Under such conditions, the refrigerant will tend to remain in the outdoor coil circuits 2a, 2b thereby producing low suction conditions and resulting in reduced capacity for the heat pump 1. By activating the bypass valve 82, the thermal expansion valve 24 is bypassed and the flow of refrigerant from the ground coil 2 is increased.

Referring to FIG. 2, the hot water heat exchanger 22 comprises conventional components such as a hot water de-super heater 86 and a water pump 88. The hot water heater 86 transfers excess heat from the hot refrigerant (e.g. leaving the compressor 12) for heating water which is circulated by the pump 88. The hot water heat exchanger 22 provides a means for augmenting the hot water supply of the home or office.

As also shown in FIG. 2, the heat pump 1 includes external servicing ports 90a, 90b on each side (i.e. suction and discharge) of the compressor 12. The servicing ports 90a, 90b are used for maintenance of the compressor 12 and heat pump 1, for example, injecting or evacuating refrigerant and/or refrigerant oil. There are also included conventional low pressure safety switches 92a, 92b and high pressure safety switches 94a, 94b on each side of the compressor 12.

The inlet of the compressor 12 is coupled to the accumulator 14. The accumulator 14 is a known device which separates the liquid and gaseous components of the refrigerant prior to compression to ensure that only gaseous refrigerant enters the suction inlet of the compressor 12. The output port of the compressor 12 is coupled to the heat exchanger 22. The inlet of the reversing valve 10 receives the refrigerant flow leaving the heat exchanger 22. The reversing valve 10 operates to switch the direction of refrigerant flow in the heating and cooling modes.

Figure 6:
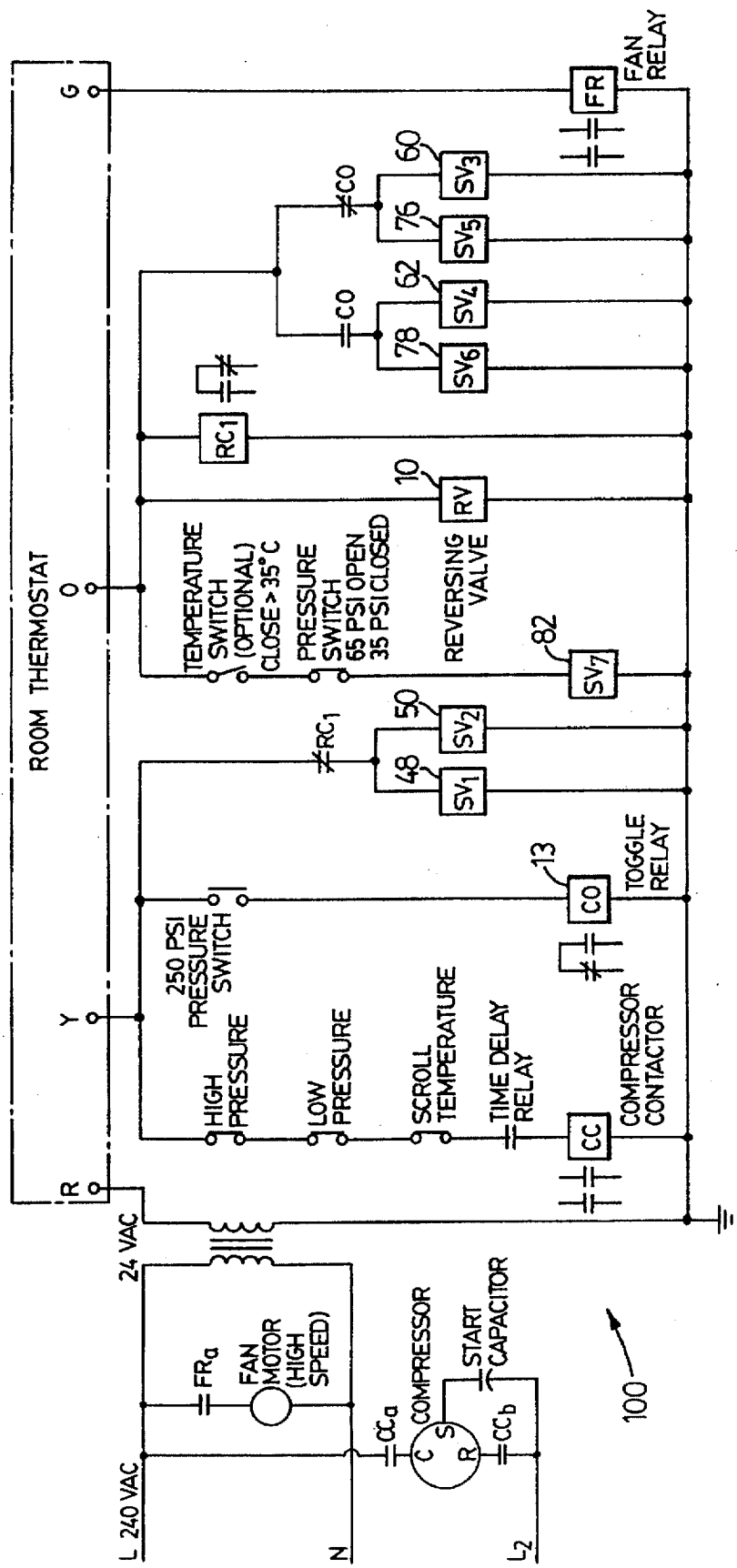
FIG. 6 is a schematic diagram of a control circuit for the heat pump of FIG. 2.

The state, i.e. open or closed, of the solenoid valves and the toggle relay described above are controlled by a control circuit. A suitable control circuit 100 is shown in FIG. 6.

In conventional manner, the heat pump 1 operates in heating mode and in cooling mode. In heating mode, the compressor 12 discharges compressed (heated) refrigerant into the indoor coil 4 which functions as the condenser, while the outdoor coil 2 acts as an evaporator and discharges the cooled refrigerant into the accumulator 14, as shown by the arrows denoted by H in FIG. 3. In cooling mode, the flow of refrigerant is reversed, and the compressor 12 forces the heated refrigerant into the outdoor coil 2, which functions as the condenser, while the indoor coil 4 acts as an evaporator and discharges the heated refrigerant into the accumulator 14, as shown by the arrows denoted by C in FIG. 4.

Heating Mode

Figure 3:
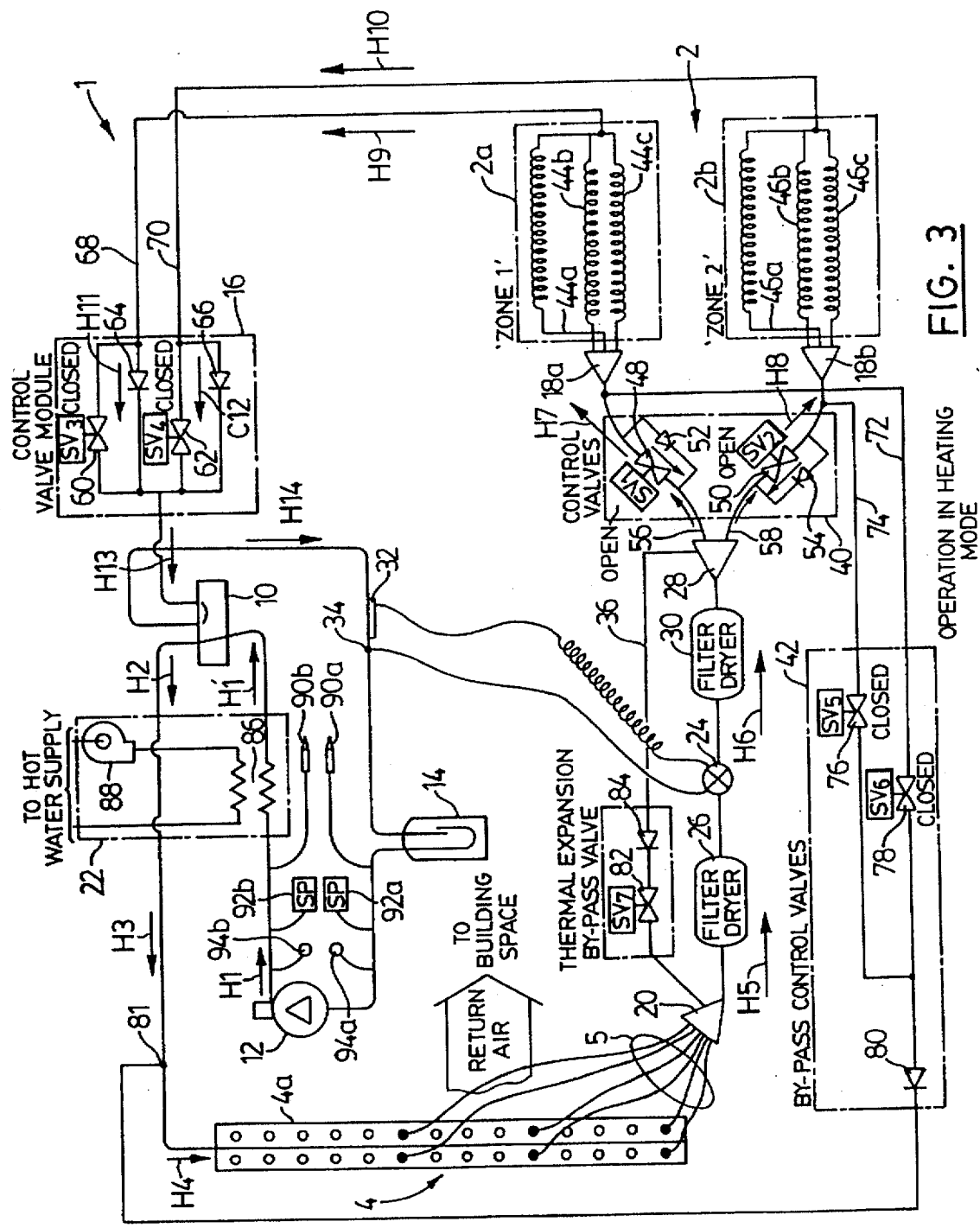
FIG. 3 is a schematic diagram of the heat pump of FIG. 2 in the heating mode of operation.

The heating mode of operation is described with reference to FIG. 3. The cycle is described beginning with the discharge of compressed (hot) refrigerant from the compressor 12. The hot refrigerant enters and leaves the hot water heat exchanger 22 as indicated by arrows H1 and H1' and then is directed by the reversing valve 10 into the indoor coil as indicated by arrows H2 to H4.

The heated refrigerant leaves the discharge port of the compressor 12 under high pressure, e.g. ~1900 kPa (260 psig), and is directed by the reversing valve 10 into the hot water heat exchanger 22 indicated by arrow H2. Water is circulated by the pump 88 through the heater 86 where excess heat from the refrigerant is transferred to the water. From the hot water heat exchanger 22, the refrigerant flows into the inlet of the reversing valve 10 as indicated by arrow H1'. From the reversing valve 10, the refrigerant flows into the indoor coil header 4a as indicated by arrows H2 to H4. The check valve 80 prevents the flow of heated refrigerant through the by-pass control valve 42.

The indoor coil header 4a splits the flow of the heated refrigerant through the parallel tubes 5 in the indoor coil (i.e. condenser) 4. A blower (not shown) passes return air from the building space over the tubes 5 and heat is transferred from the refrigerant to heat the return air flow to the building space, and the refrigerant is cooled and condenses into liquid. The refrigerant flow paths through the tubes 5 collect in the multi-port distributor 20 and pass through the first filter dryer 26 indicated by arrow H5. The check valve 84 prevents the flow of refrigerant through the by-pass valve 82 and flow path 36. From the filter/dryer 26 the refrigerant flows into the thermal expansion valve 24. The thermal expansion valve 24 meters the refrigerant for the outdoor coil circuits 2a, 2b. The amount of refrigerant released to the outdoor coil 2 is controlled by the sensing bulb 34 and thermostat 32 which measure the superheat in the evaporator (i.e. ground coils 2). To allow the thermal expansion valve 24 to operate in both heating and cooling modes, the sensing bulb 34 and thermostat 32 are preferably located at the inlet to the accumulator 14 as shown. The refrigerant experiences a significant pressure drop across the thermal expansion valve 24 and is cooled. The cooled refrigerant flows through the other filter/dryer 30 and is discharged through the distributor 28 into the outdoor coil circuits 2a, 2b. In heating mode, the outdoor coil 2 acts as the evaporator, i.e. heat from the ground is absorbed the refrigerant.

The solenoid valves 76, 78 are closed in heating mode and thereby prevent the flow of refrigerant from the distributor 28 and outdoor coil circuits 2a, 2b through the flow paths 72, 74 and the check valve 80 to the manifold junction 81.

According to the invention both coil circuits 2a, 2b are active, i.e. receive refrigerant, in heating mode. The distributor splits the refrigerant into two flow paths 56 and 58 and the flow of refrigerant to the outdoor coil circuits 2a, 2b is controlled by the control valves 40. In heating mode, both solenoid valves 48, 50 are open (i.e. energized) and the refrigerant enters the ground coils 44a, 44b, 44c and 46a, 46b, 46c in each circuit 2a, 2b respectively. The discharged refrigerant absorbs heat from the ground through the pipes 45 (FIG. 5), and the flow of the refrigerant continues in the direction indicated by arrows H9, H10 into the control valve module 16.

In heating mode, both solenoid valves 60, 62 in the control module 16 are closed (i.e. de-energized) and the heated refrigerant flows through the check valves 64, 66 into the reversing valve 10. The flow of the refrigerant is indicated by arrows H11, H12, H13. The two paths through the check valves 64, 66 join at the reversing valve 10 and the refrigerant flows from the valve 10 into the accumulator 14. The accumulator 14 separates refrigerant vapour from any excess liquid, i.e. non-evaporated refrigerant. The vapour/liquid is drawn into the suction port of the compressor 12 and the heating cycle is repeated.

Cooling Mode

Figure 4:
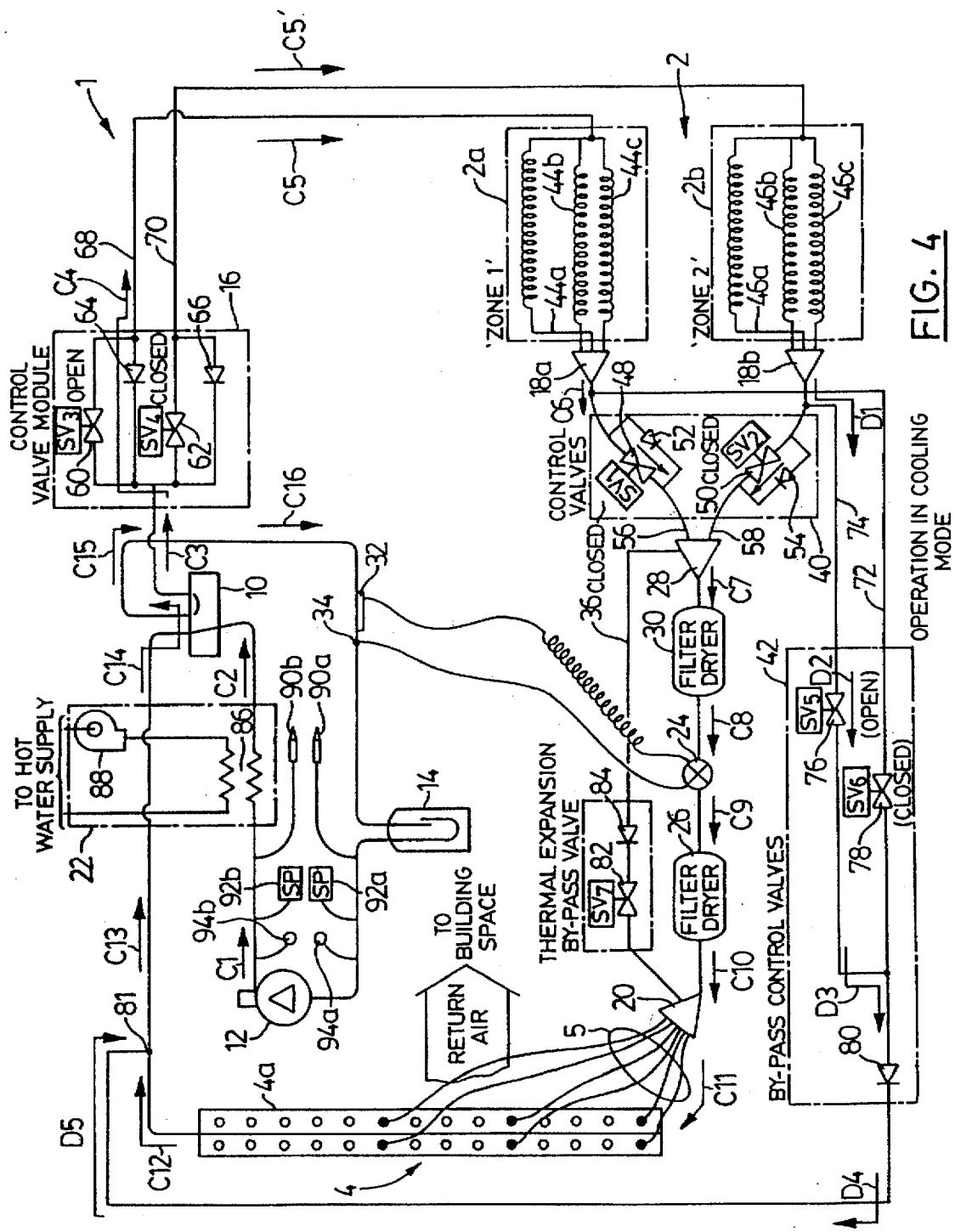
FIG. 4 is a schematic diagram of the heat pump of FIG. 2 in the cooling mode of operation.

Reference is next made to FIG. 4 to describe operation of the heat pump 1 in cooling mode. In cooling mode, the outdoor coil 2 functions as the condenser and the indoor coil 4 is the evaporator. For one compressor cycle in cooling mode, the primary flow of the refrigerant is indicated by arrows C1 to C16 in FIG. 4 and the secondary flow is indicated by arrows D1 to D5.

Beginning at the exhaust port of the compressor 12, the compressed refrigerant (~1800 Kpa) discharges into the hot water heat exchanger 22 as indicated by arrow C1. From the heat exchanger 22, the refrigerant flows into the inlet of the reversing valve 10 as indicated by arrow C2. In the cooling mode of operation, the position of the reversing valve 10 is reversed so that the refrigerant flows into the control valve module 16 coupled to the outdoor coil circuits 2a, 2b which serve as the condenser. The hot refrigerant from the compressor 12 delivers heat to the ground through the ground coils 44a, 44b, 44c (or 46a, 46b, 46c during the next compressor cycle). The refrigerant partially condenses during this process.

During the cooling cycle, only one outdoor coil circuit 2a or 2b is utilized for each cooling cycle, i.e. compressor cycle. The flow of refrigerant through one of the coil circuits 2a or 2b is controlled by the control valve modules 16 and 40. The flow of refrigerant is directed through the "zone 1" outdoor coil circuit 2a by opening (i.e. energizing) solenoid valves 48 and 60. The two solenoid valves 50 and 62 are closed (i.e. deenergized) to isolate the "zone 2" coil circuit 2b from the main flow path. The flow of the refrigerant from the reversing valve 10 and into the outdoor coil circuit 2a (i.e. zone 1) is indicated by arrows C1 to C7.

Referring still to FIG. 4, when the first outdoor coil circuit 2a, i.e. zone 1, is active the solenoid valve 76 in the by-pass control 42 is energized to provide a flow path for refrigerant from the deactivated "zone 2" coil circuit 2b into the junction 81 at the indoor coil header 4a. This allows the heat pump 1 to borrow additional refrigerant from the dormant outdoor coil, e.g. 2b, and thereby provide efficient operation in cooling mode without the need to externally add refrigerant to the system. The flow path of the additional refrigerant borrowed from the deactivated outdoor coil circuit 2b is indicated by arrows D1 to D5.

The open solenoid valve 60 in the control valve module 16 directs the refrigerant into the ground coils 44a, 44b, 44c of the first outdoor coil circuit 2a. The refrigerant is cooled by the ground and condenses in the ground coils 44a, 44b, 44c. The distributor 18a collects the condensed refrigerant from the ground coils 44a, 44b, 44c and the refrigerant is directed by the check valve 52 (the solenoid valve 48 is closed) along the flow path 56 into the distributor 28.

From the distributor 28 the condensed refrigerant enters the first filter/dryer 30 and then the thermal expansion valve 24. The thermal expansion valve 24 meters the amount of cooled refrigerant which is passed to the pipes 5 in the indoor coil 4. The metering of the refrigerant is controlled by the sensing bulb 34 and thermostat 32 coupled to the suction inlet of the accumulator 14. In the thermal expansion valve 24, the refrigerant experiences a pressure drop which causes the refrigerant to cool. The cooled refrigerant then flows through the other filter/dryer 26 into the pipes 5 connected to the header 4a of the indoor coil 4. A blower (not shown) passes air across the indoor coil 4 causing the refrigerant to absorb heat from the return air flow and thereby cool the building space. The heated refrigerant is passed through the indoor coil manifold 4a as indicated by arrow C12.

At junction 81, the flow of refrigerant is augmented by additional refrigerant from the dormant outdoor coil circuit. With zone 1 (i.e. coil 2a) active, the dormant coil circuit is 2b and the solenoid valve 76 in the by-pass control 42 is open (i.e. energized) to permit the flow of refrigerant from the ground coils 46a, 46b, 46c and through the check valve 80 into the junction 81 as indicated by arrow D5. At the junction, the refrigerant from the second coil circuit 2b is added to the refrigerant from the indoor coil manifold 4a.

Referring to FIG. 4, the refrigerant then enters the reversing valve 10 (arrow C14). The reversing valve 10 directs the refrigerant (arrows C15 and C16) to the suction inlet of the accumulator 14. The accumulator 14 separates the refrigerant vapour from the excess liquid and the separated refrigerant is drawn into the compressor 12. For next cooling cycle, the second outdoor coil circuit 2b, i.e. zone 2, is activated by energizing solenoid valves 62 and 78, while the first coil circuit 2a is deactivating by closing solenoid valves 60 and 76 (which were previously energized). An energized solenoid valve 78 allows additional refrigerant to be borrowed from the now dormant first outdoor coil circuit 2a. The switching between the ground coil circuits 2a, 2b is accomplished through the toggle relay 13 which is depicted in the schematic for the control circuit 100 in FIG. 5.

The bypass valve 38 and line 36 help the operation of the heat pump 1 in cooling mode. If the ground surrounding the coil circuits 2a, 2b is too cold, for example in spring, and the heat pump 1 is operated in cooling mode it can be difficult to remove the refrigerant. If the suction pressure drops below 240 kPa (35 psig), the solenoid valve 82 is opened (i.e. energized) and kept open until the suction pressure increases to 450 kPa (65 psig). When the solenoid valve 82 is open refrigerant flows from the distributor 28 through the bypass flow path 36 thereby by-passing the thermal expansion valve 24.

The position of the solenoid valves in the cooling and heating modes of operation is summarized in Table 1 below.

The present invention may be embodied in other specific forms without departing from the spirit or essential characteristics thereof. Therefore, the presently discussed embodiments are considered to be illustrative and not restrictive, the scope of the invention being indicated by the appended claims rather than the foregoing description, and all changes which come within the meaning and range of equivalency of the claims are therefore intended to be embraced therein.

What is claimed is:

1. A heat pump operable in heating mode to heat a building space and cooling mode to cool the building space, said heat pump comprising:

(a) a compressor coupled to a reversing valve for providing a refrigerant flow in the heat pump;

(b) an indoor coil coupled to said reversing valve for receiving refrigerant;

(c) an outdoor coil coupled to said compressor, and said outdoor coil having first and second coil circuits coupled to said reversing valve for receiving refrigerant;

(d) coupling means for coupling said indoor coil to said outdoor coil for providing a flow path for said refrigerant between said indoor coil and said outdoor coil, and including means for reversing said flow path; and (e) actuator means for alternately actuating one of said coil circuits in said outdoor coil when operating said heat pump in cooling mode, so that one of said coil circuits is active for receiving refrigerant from said compressor.

2. The heat pump as claimed in claim 1, wherein said actuator means comprises a first control valve pair connecting said first coil circuit to said reversing valve and to said coupling means and a second control valve pair connecting said second coil circuit to said reversing valve and said coupling mean, and said first and second control valve pairs having means responsive to a control signal for activating said first and second control valves and said valve pairs allowing the flow of refrigerant in said active state.

3. The heat pump as claimed in claim 2, wherein in said heating mode a control signal is generated for activating both of said first and second control valve pairs during a

TABLE 1

| | SOLENOID VALVE POSITION | | | | | | |
|---|---|---|---|---|---|---|---|
| Valve no. | 48 | 50 | 60 | 62 | 76 | 78 | 82 |
| Heating | Open | Open | Closed | Closed | Closed | Closed | — |
| Cooling | Closed | Closed | Alternate together with 76 | Alternate together with 78 | Alternate together with 60 | Alternate together with 62 | Control Device |

Reference is next made to FIG. 6 which depicts in schematic form a control circuit 100 for the heat pump 1 according to the present invention. The circuit 100 is of conventional design and within the understanding of one skilled in the art. Briefly, the schematic of FIG. 6 shows that the solenoid valves 48, 50 are activated as pair. The solenoid valves 62, 78 are also activated as a pair. In cooling mode, the states of the solenoid valve pairs 60, 76 and 62, 78 alternate with only one valve pair being energized during a compressor cycle. The toggle relay 13 (FIG. 6) is activated, i.e. switched, at the end of each compressor cycle during cooling mode. As shown in FIG. 6, the control circuit 100 includes terminals R, Y, O and G for connecting to a suitable room thermostat (partially shown in broken outline).

compressor cycle so that refrigerant is received from the reversing valve by said first and second coil circuits.

4. The heat pump as claimed in claim 2, wherein during operation in cooling mode a control signal is generating for activating one of said first and second control valve pairs and said active control valve pair alternating for each compressor cycle.

5. The heat pump as claimed in claim 4, further including means for withdrawing refrigerant from said inactive coil circuit and adding said withdrawn refrigerant to the flow of refrigerant.

6. The heat pump as claimed in claim 1, wherein said compressor includes an accumulator for separating gaseous refrigerant from liquid refrigerant and said coupling means includes a valve having sensor means coupled to the input of said accumulator for sensing the temperature of said refrigerant and metering the amount of refrigerant flowing between said indoor and outdoor coils.

7. The heat pump as claimed in claim 6, wherein said coupling means includes means for bypassing said valve when the suction pressure drops below 240 Kpa.

8. The heat pump as claimed in claim 1, wherein each of said outdoor coil circuits comprises a plurality of coils formed from piping.

* * * * *